United States Patent [19]
Hait

[11] Patent Number: 5,630,057
[45] Date of Patent: May 13, 1997

[54] SECURE ARCHITECTURE AND APPARATUS USING AN INDEPENDENT COMPUTER CARTRIDGE

[75] Inventor: John N. Hait, Missoula, Mont.

[73] Assignee: Progressive Technology Inc., Missoula, Mont.

[21] Appl. No.: 677,324

[22] Filed: Jul. 1, 1996

Related U.S. Application Data

[63] Continuation of Ser. No. 235,248, Apr. 29, 1994, Pat. No. 5,581,763, which is a continuation of Ser. No. 512,815, Apr. 23, 1990, abandoned, which is a continuation-in-part of Ser. No. 206,001, Jun. 14, 1988, abandoned.

[51] Int. Cl.$^6$ ................................................ G06F 13/00
[52] U.S. Cl. ................................................ 395/186
[58] Field of Search ................................. 395/186, 700

[56] References Cited

U.S. PATENT DOCUMENTS

| | | | |
|---|---|---|---|
| 4,817,140 | 3/1989 | Chandra et al. | 380/4 |
| 4,932,826 | 6/1990 | Moy et al. | 414/277 |
| 5,025,486 | 6/1991 | Klughart | 455/54 |
| 5,065,262 | 11/1991 | Blackborow et al. | 360/75 |
| 5,438,674 | 8/1995 | Keele et al. | 395/404 |
| 5,497,479 | 3/1996 | Hornbuckle | 395/491 |

*Primary Examiner*—Kevin A. Kriess
*Assistant Examiner*—John I. Chavis
*Attorney, Agent, or Firm*—Leonard D. Schappert

[57] ABSTRACT

A computer architectural and apparatus system for preventing software copying or alteration, and providing enhanced computational capabilities, physical information security, and physical environment protection is disclosed. The system comprises an Independent Computer Module (ICM), and an Interface Unit. The ICM comprises a CPU, a RAM, a ROM, a memory switching means, a communications port, and a connectorless interface contained within a sealed cartridge. The Interface Unit comprises a receptacle for receiving the ICM, which contains a matching connectorless interface, and wiring to a host computer's port and power. The connectorless interface uses directional electromagnetic emitters and sensors to prevent signal leakage. The memory switching means turns off the entire secure memory, enabling non-secure programs to be run from another section of RAM. Reactivation of secure memory by a non-secure program causes program control to be transferred to a fixed address within the secure program.

15 Claims, 2 Drawing Sheets

SECURE ARCHITECTURE AND APPARATUS USING AN INDEPENDENT COMPUTER CARTRIDGE

This application is a continuation of application Ser. No. 08/235,248, filed Apr. 29, 1994, U.S. Pat. No. 5,581,763, which is a continuation of application Ser. No. 07/512,815 filed Apr. 23, 1990, abandoned, which is a continuation-in-part of application Ser. No. 07/206,001 filed June. 14, 1988, abandoned.

References Cited
U.S. PATENT DOCUMENTS

| 4,652,990 | 3/1987 | Pailen et al. | 364/200 |
|---|---|---|---|
| 4,521,853 | 6/1985 | Guttag | 364/200 |
| 4,328,542 | 5/1982 | Anastas et al. | 364/200 |

FIELD OF THE INVENTION

The present invention is related to the safe and secure operation, transfer, and distribution of computer software and data. The present invention addresses three major security problem areas: software security, software physical security, and hardware security.

BACKGROUND OF THE INVENTION

Security problems arise during the use of software in computers whenever the host computer's architectural arrangement permits applications programs to be copied and/or altered. Pirates, whether they are "authorized" users or not, freely copy software for unauthorized sale and use. Software theft has become a multi-billion dollar illegal industry that is unstoppable by the prior art. Alteration of application programs by other computer programs also causes major computer security problems.

Rogue computer programs called "viruses" or "worms" alter software to produce unauthorized, undesirable, and often damaging effects. Such self-replicating secretly-operating programs are most often transferred from a rogue-contaminated computer into a new host computer by authorized operators who do not realize that these programs have entered by means of diskettes, modems or networks . . . and have attached themselves so as to lie hidden in unused areas of the host computer's data storage and active memory; integrated themselves into operating systems; and/or attached themselves to other host-stored applications programs. Once inside, a cleverly written rogue will pose a continuing threat from within tho host computer, and is capable of compromising the security of anything that passes through the infected computer to any other computer, since it is able to copy, alter, destroy, and/or scramble any information that is electrically accessible to any other program operating in the host computer. As a result, rogue programs have been used successfully to circumvent security programs for espionage, sabotage, and extortion.

Copying and alteration is enabled by the basic architectural arrangement of prior art computers, which permits all host-run programs to have equal and unrestricted access to all of the host computer's resources including: mass data storage devices, console I/O; inter-computer communications; computer peripherals; and any prior art security device attached to the host computer. Typically, a copy of an applications program stored on a mass data storage device is down-loaded into the RAM of the host computer. Once in RAM, that program copy is able to be altered and/or copied to any host resource, because the host resources are directly controlled by the command coding of the program which is operating in the host computer's memory regardless of whether the program in operation is a well behaved program, or an insidious rogue program.

Mass data storage devices are an especially vulnerable resource, since host-loaded programs are able to command any information to be copied into RAM, altered or eliminated . . . including copies of other applications programs. Computers are unable to determine the intent of a program. Yet, no means is provided to prevent rogue-infected applications programs from accessing information directly. As a result, any program operating in the host computer's memory is able to avoid information-protecting security software; run any other software while monitoring its operation; and alter, copy, or destroy any information, (program or data,) that is electrically accessible to programs having a different intent. Even the prior art security devices and their controlling host-run security software are subject to rogue attack, since they require the use of secure, dependable host-run programs to maintain security . . . programs that are able to be altered by other (possibly contaminated) host-run applications programs.

To prevent rogue activity, a special architecture is required, wherein the operating system in the host computer is electrically separated from potentially contaminating applications programs, which are run in an independent, isolated computer, so as to prevent direct access the host computer's resources. However, the prior art does not provide such an arrangement. As a result, only secure, dependable, well-behaved programs are able to be used in computers needing security. This precludes using any, even remotely suspect program. It hampers the ability to test and upgrade software, severely limiting the ability to maintain adequate security.

No provision is made in the prior art to run suspect programs in an isolated architecture. There are no provisions for up-loading a suspected program into the security device itself without compromising security. There are no provisions for physical distribution of applications software within a protected architecture and apparatus, nor does it permit the actual operation of applications programs within the distribution means so as to eliminate any need for down-loading software.

A rogue program hidden WITHIN A PRIOR ART SECURITY DEVICE that is able to down-load information into the host computer, which in turn, is able to become a part of host-run programming code is easily able to compromise the information contained within the host computer. Such a security device must be manufactured by a friendly source, and once wired in, it must remain a permanent part of the host computer. Prior security devices do not have provisions to protect from replacement with an unfriendly "secure" program. As a result, the host computer is not protected from the security device, and the security device is not protected from the host computer.

Physical information security, that is, the ability to physically remove from a computer all existing copies of sensitive information, and lock them up in a safe or keep them under guard, is rendered moot by the ability of host computers to make security-compromising copies of stored information . . . with, or without the operator's knowledge. Means is not provided for physical security so that the only-existing-copy of an applications program is able to be physically removed from a host computer and kept in a safe until needed, because such devices are able to leave a security-compromising copy behind.

Processors, memories, inter-resource communications means, and component interconnections are security-sensitive. If security-sensitive components are physically accessible, unauthorized equipment is able to be attached to circumvent security measures. Sensitive information in prior security devices is not protected by dedicated security-sensitive components, which are both electrically inaccessible, and housed in a single sealed removable cartridge; so that sensitive information is protected no mater what kind of a computer it is plugged into, or who plugs it in. Removal of a prior art security device from the host computer does not remove these security-sensitive components simultaneously with the applications program, and other secret information, so as to enable physical information security to be affective.

Software and other transportable information is not protected from environmental factors that easily damage or destroy transporting apparatus, and as a result the information inside.

Prior art security methods that use removable cartridges typically use connectors between a host computer's data and address bus and the information-containing cartridges. Such plug-in cartridges often spark or arc upon insertion or removal of the cartridge from its socket. Such methods become unacceptable in certain hazardous environments where explosive gases, or a high percentage of oxygen is present, where a single spark is able to ignite a fire or explosion. Such environments include the use of computers at fuel depots, and in industrial environments where computers are becoming common.

Even ordinary environments are hazardous to conventional computing equipment. Diskettes and disk drives used for software distribution contain delicate mechanical and electrical parts that fail in the presents of dirt or moisture. The result is that, the prior art does not permit such devices to be used in dirty, wet, chemical-filled, explosive, or other hazardous physical environments, while simultaneously maintaining software security. If the information-containing hardware is damaged or destroyed security has failed, because the secure information is rendered useless or inaccessible.

A related security problem arises during the use of computers which require security. Prior connectorless data communications methods, such as those that are used between some terminals and host computers, are subject to eavesdropping by near-by equipment when electro-magnetic means are used for the transfer of information.

Solutions to the above problems are not provided in the prior art as indicated in the following examples.

U.S. Pat. No. 4,652,990 of Pailen et al. discloses a user access control method, wherein a portable processor and ROM cartridge called a Key is provided with a means for connecting the Key memory to a Key Carrier Computer Bus, which is connected to a microprocessor within a security unit called a Key Carrier, which is connected between a host computer and a terminal to prevent access to the programs within the host computer by a person using that particular terminal. Authorized users insert their Key into the open bus structure of the Key Carrier. The host computer and the security unit then exchange information so that the program in the host computer is able to determine if authentication has been achieved. If so, the applications programs are then permitted to be run within the host computer.

Once an authorized user has been authenticated, he has access to applications programs which are down-loaded into the host computer. Since the Key's primary purpose is to determine authorization of those persons who are allowed to copy programs, no protection is provided to prevent any copying at all even by "authorized users". No provision is made to make copying of applications programs unnecessary by containing them in permanent ROMs within the Key cartridge. The authorized user is, as a result, able to make as many copies of the applications programs as he wishes ... which enables him to become a pirate.

The Key system is lacking several features that prevent it from providing protection from rogue programs operating from within the host computer, and from copying by users, authorized or not. As is common in the prior art, the applications programs are located in the host computer, and the Key system is designed to simply prevent a user from accessing those programs. An electrical and architectural separation is not made between the security program running in the host computer and an isolated dedicated computer for the applications program, so as to protect the host computer's resources. The application program is not contained within the portable Key cartridge, which is lacking a RAM to permit an application program to actually run inside the cartridge rather than inside the host computer. Instead, the Key system relies on a special Key controller program that must operate within the host computer. This program complements the program running in the Key carrier. It is this host-run program that determines if authorization has been verified by the security apparatus, and permits access to the actual applications program down-loaded into the same host computer.

Damaging viruses are generally introduced inadvertently from a virus-contaminated applications program being run by an authorized user. Modern applications programs are quite complex, and even expert programmers have great difficulty in determining for sure that a given program is virus free, let alone the average software user. Since the Key system leaves the applications programs, including the security-controlling program inside the host computer, such programs are just as subject to viral attack from a contaminated program operating in the host computer, under the Key system, as with the rest of the prior art.

A virus, once operating within the host computer is able to attach itself to the Key controller program, record, duplicate or simulate any of the communications between the security device and the host computer, or simply permit access by an unauthorized person on a separate terminal. Such a rogue program is able to extract security information from other applications programs and permit their use, effectively bypassing the security system imposed. Once the virus program has gained program control, all of the host computer's resources are available to it, unprotected by the Key system.

Since the Key cartridge does not prevent applications programs from being copied by an "authorized user", the applications program is unable to be maintained as the only-existing-copy of said program. If the Key cartridge is locked up in a safe when the program is not being used, a thief is still able to break in and steal the host computer with the applications program inside; dismantle the computer; access the stored information directly; and disassemble the security program to determine how to circumvent it. The thief also is able to steal the diskettes or other storage devices that said program has been copied onto. As a result, the Key system does not provide for the physical security of applications programs.

Additionally, the Key system is designed to cut off communications between a host computer and a terminal.

Many modern computers have discarded terminals all together in favor of an integrated video-keyboard-computer such as the IBM personal computer. The Key system requires a remote terminal in order to cut off user access, and is as a result, not applicable to many of today's common computers.

U.S. Pat. No. 4,521,853 of Guttag discloses a method for protecting information contained in a memory which is on the same silicon chip as a microprocessor. Peripheral devices are prevented from accessing the on-chip memory through the common bus arrangement connecting the CPU with off-chip memory. This apparatus is designed to function as the main processor of the computer. It is wired into, rather than being an addition to host computers of various types. A standard bus arrangement is used that is not isolated from a host computer to prevent the addition of security-defeating equipment. Host resources are not protected from a rogue program being operated by this processor, as it is connected directly by its bus system to the host resources in the conventional manner. Rogue programs are able to gain entry into the host computer because the applications programs are run inside that same host computer, rather than within a secure cartridge and architecture.

Like the Key system referred to above, this arrangement does not provide for the physical security of applications software, nor does it provide a convenient and secure method for the distribution of software in a secure cartridge. The device is not designed to be removed from the computer and locked up in a safe at night, nor is the software protected from destruction by hostile environments.

U.S. Pat. No. 4,328,542 of Anastas et al. uses wired-in multiple processors that are designed for the implementation and secure operation of particular parallel programming algorithms. The type of security provided is to prevent interference between multiple applications by multiple processors working on common data, even using common programs in common memory. This method had been designed to operate using well-behaved, coordinated programs written for parallel processing. This method does not provide security in the sense that a not-so-well-behaved rogue program is to be prevented from tampering with or copying information in RAM or on mass data storage devices. This example of the prior art does not address the problem of rogue-contaminated programs being down-loaded into the parallel architecture from non-secure mass storage devices. The method uses access authorization registers, an elaborate system of mating hardware, and a specialized software structure to verify the authorization of applications programs to be used in the computer itself rather than providing a secure architecture with a separate processor and dedicated memory to run applications programs. Host resources remain accessible to all programs, including rogue programs that are able to gain entry by means of contaminated authorized programs.

SUMMARY OF THE INVENTION

It is therefore an object of this invention to provide a new secure computer architectural and apparatus system for preventing copying or alteration of protected information.

It is the further object of this invention to provide a means for the distribution of software which does not leave the secure computer architecture by being down-loaded into any other device. Said software being stored, transported, and operated inside of the secure architecture and apparatus.

It is the further object of this invention to provide a computer architecture whereby applications programs are electrically isolated so as to prevent direct access to host computer resources.

It is the further object of this invention to provide a computer architecture wherein applications programs that are not originally a part of protected information are able to be up-loaded into the secure architecture and apparatus, modified, and operated; while still preventing these up-loaded applications programs from directly accessing host computer resources, or even the original applications programs manufactured into said apparatus.

It is the further object of this invention to provide protection for security-sensitive components within a single cartridge housing, including: ROM and RAM memories, a dedicated processor, inter-device communications, and an isolated memory control, address, and data bus system to prevent the direct accessing of information in said protected memories except by said dedicated processor under the sole control of command instructions within said protected memories.

It is the further object of this invention to provide a means to allow security-sensitive components of the new architecture, along, with protected information, all in a single cartridge housing, to be physically and simultaneously removed from the host computer and locked in a safe during periods of non-use in order to provide physical security for software and other information.

It is the further object of this invention to provide a means for the distribution of information, including software, in an apparatus that is less sensitive to physically damaging environmental factors.

It is the further object of this invention to provide a means for enhanced computational capabilities by providing at least one additional fully functioning secure computer which runs simultaneously with a host computer.

The system consists of a specialized computer architecture and apparatus having a specially selected portion contained within a special sealed cartridge, together called an Independent Computer Module (ICM). The ICM contains a fully functioning computer including: a CPU, RAM, ROM, a specialized memory switching means, and a communications port for providing a two-way communications link with a host computer, through a specialized connectorless interface (rather than a conventional plug or connector.) The host computer is fitted with a receptacle for holding the ICM, called an Interface Unit, which contains a matching connectorless interface, and a means for direct electrical connection to a communications port on the host computer, and a means to supply electrical energy to the ICM.

The ICM is inserted into the Interface Unit. The host computer contains a program for communicating with the ICM that provides ICM-based programs with host-software-controlled access to the host's various hardware resources such as mass data storage, keyboard input, and video display. The applications program within the ICM requests the services of a host function by sending a function command, and any needed data, over the communications link. The host computer responds by accomplishing the requested function, in a manner similar to the way a conventional operating system (such as MS-DOS) provides such services to an applications program running in the host memory. However in this case, the operating system program returns any required response to the ICM through the communications link.

The operating system program does not need to authenticate authorized users in order to provide security, since primary security is provided by the architecture and apparatus, not by the software in the host computer. No new programming methods are required. The above list of tasks required for the operation of ICM-based programs is common to the programming art.

In the prior art, it is common to have a wide variety of outside devices controlling computer memory, I/O, and even the CPU itself. Multiple programs are commonly loaded into memory, each having complete access to all of the host computer's resources. It is a major feature of the present invention that the ICM is a fully functioning computer, separate and isolated from the host computer, by the fact that there are no address or control bus connections between ICM components and the CPU of the host computer, or any other device outside of the ICM cartridge. Rather, the teachings of this invention require a two-way communications link that is always controlled by the cartridge-borne computer on one end, and the host computer on the other end. The ICM provides this controlled information transfer through a communications port, within the ICM cartridge. Control wires for this two-way communications port are only connected to the ICM-based CPU (other than conventional handshaking signals which only indicate the presence of information to be transferred and do not actually transfer said information into ICM or host memory.) This CPU is connected to no memory, except that which is contained within the ICM cartridge. As a result, the communications port will respond only to command-signals from the ICM-based CPU, which is activated by no command coding except those program codes which are contained in the ICM memory.

The direct result of this architecture is that ICM-based program commands are the exclusive means for controlling: 1. information transfer into and out of the ICM cartridge; 2. the addresses in ICM memory where input information is stored or output information is taken from; and 3. whether or not any such information ever becomes a part of ICM program command coding. Because of this centralized control, a specific routine within the ICM-based program to output or alter any portion of ICM-based information, including program code, is the only method by which information in any ICM memory is able to be output or altered. In the absence of any such routine, no copy of said information is able to be provided to any outside device. Likewise, no input information is able to become a part of the ICM-based program code without a direct provision in the ICM program for including such as a part of its program code. Because of the new architectural arrangement, the ICM-based program is able to protect itself from alterations and copying. Note that new programming methods and electronic components are not required to implement such programming, or operate such a port, which is similar in operation to the common RS-232 type port in a conventional computer.

Listed below are a series of benefits that are produced as a direct result of this portion of the new architecture, and help explain why it actually produces greater security.

ICM-based programs are unable to be copied out of, or altered within the ICM cartridge without the use of specific preprogrammed routines that must be a part of the coding manufactured into the ICM. Barring any such routine inserted at the time of manufacture, ICM-based programs are unable to be copied or altered. As a result, ICM-based programs are unable to be pirated by authorized users, or successfully attacked by a rogue program such as virus or worm.

The ICM architectural system provides security for the host computer even from a rogue program that potentially is even able to be manufactured into an ICM. Such protection is provided for the same reasons the new architecture produces security for the ICM-based programs namely: a separate computer for the applications program, bus separation, and a host-controlled communications port. The host computer necessarily has to apply the same programming restrictions, namely: information down-loaded from an ICM is not to be used as program code within the host computer, and host-defined secret information is not to be up-loaded into an ICM—functions which are completely defined and controlled by the command structure of the host software. If the host computer is designed to use ICM programs exclusively, then the host computer is able to be kept clean of any viral contamination, because all applications programs are run inside ICMs rather than in the host computer.

The new architectural arrangement allows limits to be placed on ICM access to important host resources such as mass data storage, so that only information which the host operating system program is programmed to transfer are able to be. For example, the host program is able to allow the ICM-based program to read information from a disk file by name, but is able to prevent access to stored information by track and sector, such as a host-borne applications program is able to do. Such direct access to mass data storage is a common way in which virus programs are able to spread. By preventing direct track and sector access, the host computer is safeguarded from this type of rogue program attack.

The host program is able to restrict file access by an ICM-based program to authorized data files, and is able to prevent alteration, copying, or unauthorized use of host-run software. This prevents the program running in the ICM from circumventing any security provisions the host program imposes by directly accessing the hardware. Because of this, security is provided for both ICM and host. This method allows the host program to limit the activity of potential rogue programs that are able to be manufactured into an ICM, while protecting ICM programs from potential rogue programs in a host computer.

The above listed benefits come as a direct result of the above-described portion of the new architecture, but the exact implementation and coding needed to accomplish the above procedure is already a standard part of the programming art.

Another important portion of the new architecture is memory bank switching. This bank switching arrangement consists of a division of the ICM internal memory into at least two types of subdivisions called Executive Memory and General Memory; each is independently addressable. A means is included for selecting or not selecting the entire Executive Memory by turning on and off all read/write bus access to it. Access is turned off by the ICM-based CPU execution of a specific command from an ICM-based program. A latch is provided for holding the off state until access is resumed (turned on) by the execution of another specific direct program command from the ICM-based CPU. However, the command control signal which switches the Executive Memory back on is connected so as to simultaneously produce a non-maskable interrupt, that is, a forced program control jump to a fixed location within the secure Executive Memory. The two memory subdivisions are able to be made up of both RAM and ROM, however the secure Executive section has at least one portion constructed which uses a non-volatile ROM, and a portion of the General Memory subdivision is constructed using read/write RAM. This feature of the new architecture works harmoniously with the other features of the present invention in order to produce security results unavailable in the prior art.

The following sequence of programming events illustrate how this portion of the new architecture is used to produce enhanced security. As in conventional computers, upon power-up a restart signal initializes the program instruction pointer register of the CPU to a fixed starting address, where the initializing program begins. In the ICM, this fixed starting address is in the security-controlling program in the Executive Memory put into ROM during ICM manufacture. The secure program is then running, having the entire ICM memory protected by its bus isolation from the host computer, and available for use. Then, either because of a function request from the host computer to the ICM, or because of a needed of the secure program, a function command is issued by the ICM to the host computer to up-load program instructions of another, possibly non-secure, program. Up-loaded instructions are then written by the secure program into the RAM of the General Memory section, but are not yet executed as a part of any program instructions. Rather, the secure program issues a specific command to turn off the entire secure Executive Memory subdivision making the programs contained in it, electrically inaccessible to the ICM-based CPU, and any program in the General Memory. Only then is program control transferred to the up-loaded program. Upon completion of the up-loaded program, a specific command is issued by the up-loaded program, to turn the secure Executive Memory back on. Because of the new architecture, an automatic, simultaneous jump occurs in program control to a fixed address within the secure Executive Memory. The program coding which begins at this address, is able to examine CPU registers to determine if an allowable function request is underway, or is able to terminate the non-secure program. Not allowable functions for which no programming code is provided, include those requests which copy secret information into GENERAL RAM, down-load secret information to the host computer, alter secure programs, or transfer program control to a non-secure program while bypassing the required Executive Memory turn-off procedure above. If the non-secure program is terminated, then General Memory RAM is able to be overwritten, clearing it for secure use once again.

The actual program codes used to accomplish the above listed steps are a matter of the common programming art, and depend upon the ICM-based CPU type. But, the above sequence of events is required for the proper operation of the invention, which will then produce these direct results: Non-secure programs and subroutines are able to be up-loaded into the ICM and run without compromising the secure areas of ICM memory, because the secure Executive Memory is completely inaccessible to the ICM-based CPU when in the off state. Secure programming is able to resume without compromising security because program control is immediately transferred to a specific security routine in the secure Executive Memory. Secure-program-controlled communications are able to take place between secure and non-secure programs within the ICM.

The same security which is afforded the host computer from potential rogue programs in the secure portion of an ICM, as described above, is afforded to the host computer during the operation of non-secure, suspect, or any other program up-loaded into the ICM, for the same architectural reasons, namely: an independent applications-program-running computer, bus separation, controlled communications link, and selected programming which does not include security compromising routines in the host program. The host computer is able to prevent copying, alteration, or viral contamination of critical software. The host computer is still able to maintain its general purpose nature by running only the security operating system used to communicate with the ICM, operating only ICM-based programs, and/or by up-loading all other applications programs into the secure confines of the ICM.

It is an integral feature of the present invention that all of the security-sensitive components of the new architecture be sealed into a single removable cartridge. The cartridge provides portability, and the ability to interchange secure applications programs, while protecting the internal components from both damage, and security-circumventing additional bus connections. Important applications software actually run inside the cartridge, which is the actual means of providing physical software distribution, eliminating the need for program copies, and down-loading. The cartridge prevents physical access to the security-sensitive components, also to prevent altering and copying.

The cartridge portion of the invention directly provides security benefits that a simple cartridge does not provide for a conventional architectural arrangement. In the prior art it is common to connect a ROM within a cartridge directly to the host computer's data and address bus, or to down-load applications programs into the host computer for operation. This immediately puts this important information in jeopardy because a rogue program is able to be operating in the host computer, which then has direct access to the cartridge-borne information. In the present invention, secure programs are NOT DOWN-LOADED from the ICM cartridge into any other device. As a result, the ICM-based information is able to be, and is able to maintain its status as, the ONLY-EXISTING-COPY of that secret information, which is UNABLE TO BE COPIED. The ICM cartridge is able to be physically removed from the Interface Unit, and as a result, from the host computer. Removal takes with the cartridge that only-existing-copy of the secret information, the applications program, the protecting CPU, memory, bus, and communications port. Altogether, all of the security-sensitive parts are able to be locked in a safe, or otherwise physically guarded, so as to provide physical security for both the ICM and its internal information. With conventional architectures, copies of cartridge-borne, or diskette-borne information are both easy to make and commonly made. As a result, locking up the conventional cartridge or diskette is of little or no value, because a security-compromising copy is able to exist outside of the cartridge.

Transferring the ICM cartridge to another host computer, simultaneously transports all of the security-sensitive components inside, and the security-controlling applications program in ROM. As a result, all software security requirements (such as passwords) are able to be enforced by the ICM itself at any time, on any host computer. If the cartridge were to fall into unauthorized hands, no specially constructed or programmed host computer is able to bypass the security provisions.

Certain programming methods are more suitable with certain CPU types. This transferability of the cartridge allows ICMs to be constructed using a wide range of CPU types, so that programs are able to be tailored to special needs without having to build an entire computer system to match. No special type of CPU is required within the host computer in order to run ICM-based programs, only similar resources. The result is that, the same ICM-based programs are able to be used, securely, on completely different host computers. Unlike the prior security apparatus, ICM applications programs are host-CPU-type independent.

The ICM is a secure general purpose computer, however, its unique combination of special features enables the implementation of a new class of security program . . . one-of-a-kind cryptographic programs having internal ciphering keys.

Cryptographic programs with built-in ciphering keys are not new, but they are impractical in conventional computers because programs are so easily copied. To prevent the proliferation of programs that are able to directly decrypt secret information, the ciphering keys have been made separate from the programs that contain the cryptographic algorithms. Such keys are generally entered by the operator at the time of decryption. In order to be effective, cipher keys must be very long and very random, which presents quite a problem for the humans that are supposed to remember them. Additionally, today's supercomputers are quite capable of breaking common codes such as the 7-byte long DES encryption method that was thought to be quite safe just a few years ago. As a result, it is advantageous to use longer keys, as every bit added to a key doubles the possible combinations a cipher-breaking program is required to go through.

The ICM system is the ideal method for the implementation of cryptographic programs with built-in cipher keys. The ICM is able to contain the only-existing-copy of the one-of-a-kind program that itself is unable to be copied, or altered. Cipher keys are able to be as long as needed. A million-byte, completely random key is quite easy using today's high density ROM chips. The large memory capability and the secure nature of the ICM allow the ICM programmer to use the most effective algorithms and keys possible. Moreover, no human need even know what the key is. The key is able to be machine-generated, and stored in the ICM during manufacture. Since the physical possession of a unique cryptographic ICM is required, rather than knowledge, a potential thief is unable to eavesdrop to determine the key. Nor will it be of any value to demand, at gun-point, to know what the secret key is, since no human even knows what it is. When the ICM is locked in a safe, so is the only method by which encrypted information is able to be decrypted. In most security applications the ICM is able to reduce the number of people who need to have access to secret information in order to remember the key. As a result, the ICM eliminates the problems caused by the common human tendency to hide the key in a convenient-to-find (even by a thief) location, or to choose easy-to-remember (easy-to-break) keys.

The programming codes used to implement these specialized cryptographic programs are common to the programming art. Using such programs in an ICM enhances their value, making many aspects of security much easier—as the following procedural examples depict.

If these cryptographic programs are manufactured into the ICM as a part of the initial ROM-loaded applications program, that program is able to be the only-existing-copy of a file decryption program which loads a file to be decrypted into the ICM RAM, and then decrypts the file right inside tho ICM cartridge itself. The applications program is able to operate on this secret information, encrypt it again, and replace it into the mass storage device in the host computer. Because the information is not down-loaded into the host computer in its decrypted form, the secret information is able to be used by the applications program inside the ICM cartridge without a decrypted copy ever being available outside of the cartridge. When the ICM is locked in a safe, both the ICM and the encrypted information left behind in the host computer remains secure. When the ICM and encrypted information is transferred to a different (potentially non-secure) host computer the ICM-encrypted information remains secure. The ability to decrypt and utilize ICM-encrypted information requires a particular ICM cartridge with that one-of-a-kind program inside, regardless of the particular host computer. And any altering of encrypted data, when it is outside of the ICM cartridge, is easily detectable during decryption so that faulty data is able to be discarded.

Obviously if two ICMs are manufactured with identical only-existing copies of the cryptographic program, then a user in one place is able to encrypt information inside one ICM cartridge . . . transmit it over public communications systems to the other ICM cartridge for decryption, and then use it safely inside the second ICM cartridge.

If the file decrypted inside the ICM cartridge contains program code, then another benefit is derived. An encrypted program is able to be stored in the mass storage device of the host computer. The applications program within the ICM is able to decrypt the program while maintaining all of the security as outlined above for data. However, in this case the decrypted program is able to be run as a program from within the ICM cartridge just as outlined above for running any other up-loaded program. If the cryptographic algorithm and key are unbreakable, then the encrypted program is just as safe as the initial program inside the ICM, having all of the security benefits as outlined above for ICM ROM-based programs in the Executive Memory.

The use of encrypted programs up-loaded into the ICM has additional benefits in the fight against viruses. The ROM-based program in the ICM is safe from viral attack because of the ICM architecture, being unalterable and uncopyable. In turn, encrypted programs are able to be decrypted by that secure ROM-based program in the Executive Memory. Inside the ICM's General Memory RAM, the decrypted program is also safe from viral attack as described above. Outside the ICM, a virus is still able to attach itself to the encrypted version of a program. However, the unscrambling process of decryption scrambles the attached virus rendering the virus into inoperable garbage . . . a condition which is easily detectable by the ROM-based ICM program. As long as the cryptographic method remains secure, no virus is able to successfully operate attached such an encrypted program. Since the ROM-based program is able to be rendered inaccessible during the running of any outside program, not even a fully encrypted rogue program (if the cipher code was somehow able to be obtained) is able to cause any more damage than a non-encrypted outside program is able to accomplish. Yet the decrypted fully functioning program is able to operate properly without ever being down-loaded into any vulnerable host computer in a decrypted form.

Nothing in the new architecture prevents multiple Interface Units, and ICMs from being connected to a single host computer. As a result, by using the common programming art, a controlling program in one ICM is able to request the host to up-load routines into any other available ICM. Since each ICM is a fully functioning computer working simultaneously with the host and any other on-line ICM, the arrangement allows for an enhanced computational capability by the simultaneous processing of coordinated routines within larger programs. The routines used in such an arrangement are able to take advantage of the security provisions provided by means of program and data encryption.

The Interface Unit is necessary for the operation of the complete system, since it contains: a receptacle for holding the ICM; a connectorless interface for energy-supply and data communications; and provisions for wiring to the host computer. The energy supply is able to come from the host computer, or any other convenient source.

The connectorless interface (not using ordinary plugs or wire connectors,) provides electrical energy for powering the ICM, and two-way data communication between the ICM and the host computer. Any electro-magnetic means for effecting connectorless data communications and energy supply are able to be used including optical (ultraviolet, visible, and/or infrared), as well as radio frequency coupling means. The type of electro-magnetic emitters and sensors used in the data communications portion of the connectorless interface are directional, having corresponding emitters and sensors pointing directly into each other. Using the connectorless interface facilitates sealing the entire ICM cartridge.

The connectorless interface, together with the sealed cartridge, provides benefits to the ICM architecture that the use of a connectorless communications and energy supply means in other types of equipment does not. The ICM is primarily a security device. As a result, the hardware security that comes from sealing the ICM enhances the software security provided by the architecture, and the software physical security provided by the removable cartridge.

Unlike the prior art, the ICM is able to contain one-of-a-kind applications programs, such as the cryptographic programs described above. If the only-existing-copy of important information were to be destroyed then security fails. After all, half of security is keeping the information safe for authorized use. The connectorless interface enables the ICM cartridge to be made more secure by eliminating the need for electrical plugs, which are able to ignite a fire or cause an explosion (with the resultant one-of-a-kind information destruction,) because of the sparks that are produced when plugs are removed or inserted into their sockets. This type of physical hardware security is needed if the ICM is used in the presents of explosive gasses that are common at fuel depots and other industrial sites, as well as the oxygen-rich atmosphere of a spaceship. Explosion-proof protection provides greater security for the information inside the ICM, and greater safety for both the operator and near-by equipment.

Completely sealing the sparkless ICM enables the ICM to be made waterproof, and impervious to caustic materials, while making physical access to security-sensitive components and programs all the more difficult. As a result, the ICM is more secure than the prior art, being highly resistant to destruction even in very hostile environments.

Another security problem is solved by using directional emitters and sensors in the connectorless interface. The conventional non-directional means for implementing connectorless communications are able to be monitored by clandestine equipment. Non-directional emitters transmit in all directions, even directly out of the connectorless connection, and a non-directional sensor is able to cause reflections back out of the sensor that are also able to leak from the connection.

To protect against eavesdropping, the obvious first step is to provide electro-magnetic shielding as a part of the sealed ICM cartridge, and a shielded, sealed Interface Unit. However, shielding alone will not prevent the electro-magnetic signals used for data communication from leaking out from between the ICM and the Interface Unit.

To prevent leaking communications signals, the ICM uses a connectorless communications means comprised of directional emitters and sensors; which are able to prevent electro-magnetic radiation from leaking out of the interface connection. Output signals from each directional emitter is able to be aimed directly into its matching input sensor nearby. All direct radiations and reflections are able to be controlled by the emitter and its matching directional sensor to prevent unwanted leakage. Additionally, directional emitters and sensors are able to be used to detect any change in coupling characteristics so as to signal the presence of any mechanical alteration of either the ICM or the Interface Unit.

Many aspects of security are addressed by the present invention to harmoniously produce enhanced computational ability along with improved software security, software physical security, hardware physical security, and operator safety. Because electronic program storage methods are more reliable than mechanical ones (such as diskettes) and the ICM provides enhanced security in so many areas, using ICMs will enable a reduction in the over all number of actual copies of secure programs needed. ICM programmers will be more inclined to create fewer copies . . . in cases where multiple copies are even needed. The fewer number of secret information copies that there are in existence, the easier all security becomes.

DETAILED DESCRIPTION OF THE PREFERRED EMBODIMENT

Figure 1:
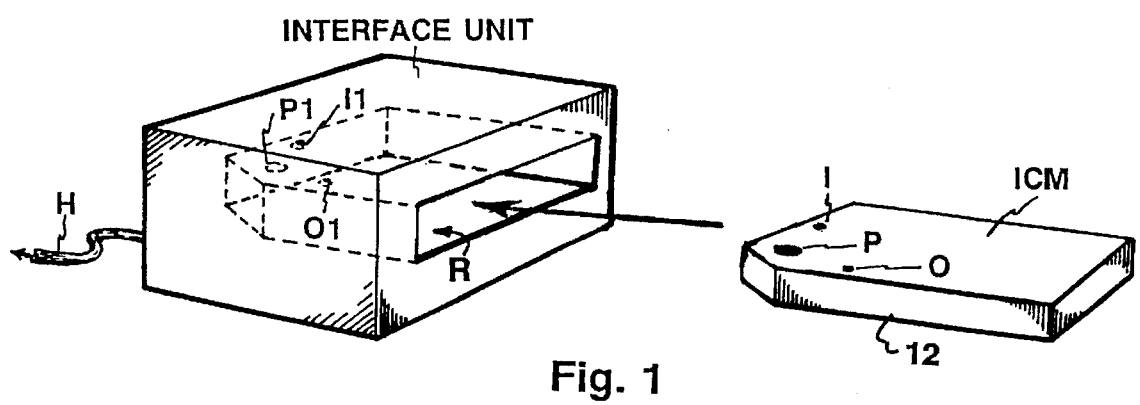
FIG. 1. An exterior perspective view of the Independent Computer Module (ICM) being inserted into an Interface Unit.

FIG. 1 depicts a perspective view of the present invention, with an ICM being inserted into the ICM holding receptacle R of an INTERFACE UNIT. The ICM has a connectorless interface comprised of a directional input sensor I, a directional output emitter O, and a power receptor P imbedded in the surface of the ICM cartridge. The INTERFACE UNIT has directional emitter I1, directional sensor O1, and power emitter P1 imbedded in its housing and positioned so that when the ICM is inserted, the ICM will be held so that matching emitter/sensor, and emitter/receptor pairs will be adjacent to each other as in FIG. 2. Wires H connect the INTERFACE UNIT to a host computer.

Figure 3:
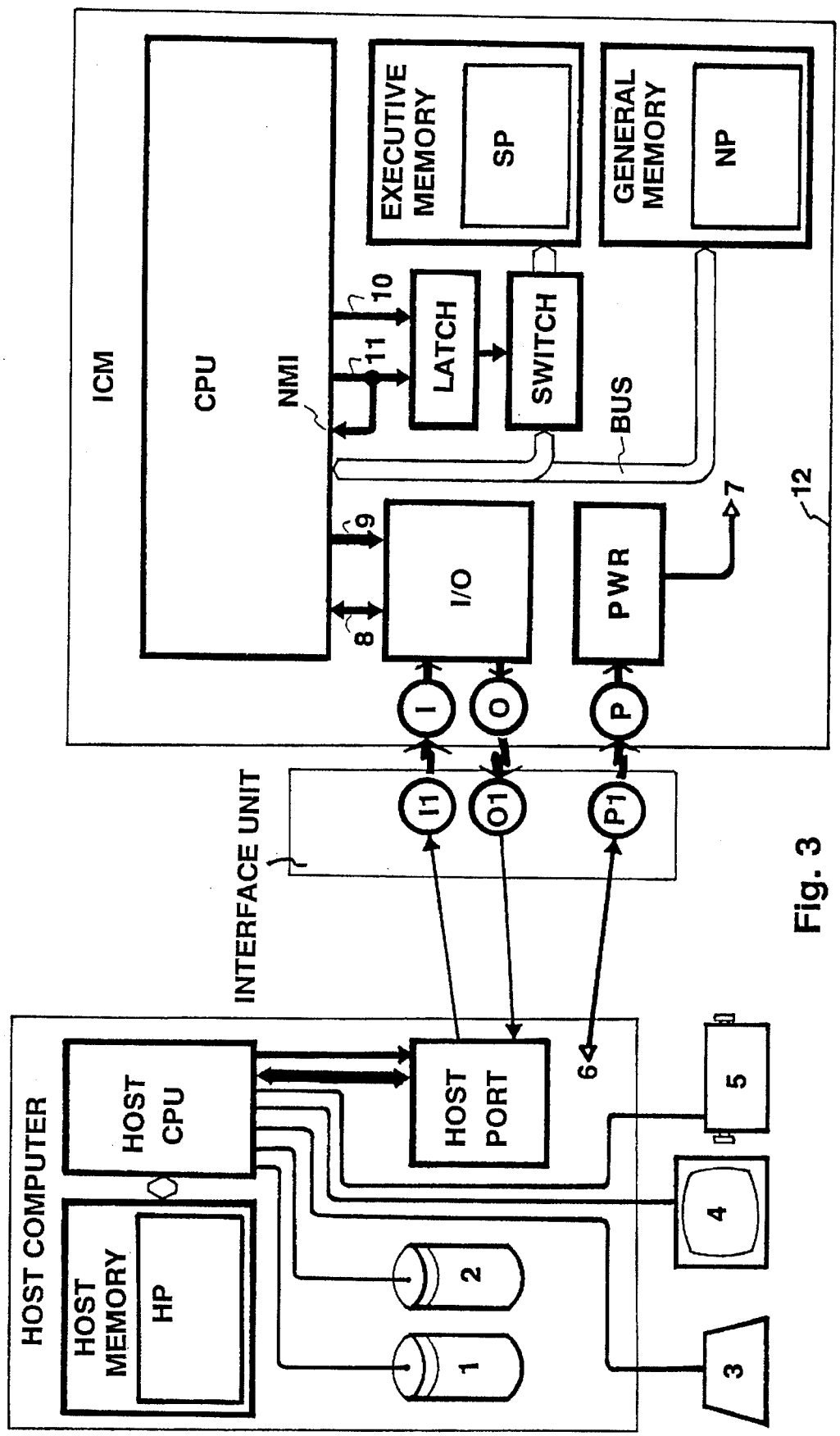
FIG. 3. A block diagram of the ICM with an Interface Unit connected to a host computer.

The ICM contains a fully functioning computer and at least one applications program connected to a host computer via the Interface Unit (see FIG. 3). When in operation the ICM is inserted into the Interface Unit The components of the connectorless interface facilitate sealing the ICM's cartridge housing 12, and the removal of the ICM. When not in use, the ICM is able to be locked in a safe or other physically secure location. Sealing the housing 12 and the Interface Unit permits the ICM to be used in flammable or explosive atmospheres, and in the presents of water or corrosive substances.

Figure 2:
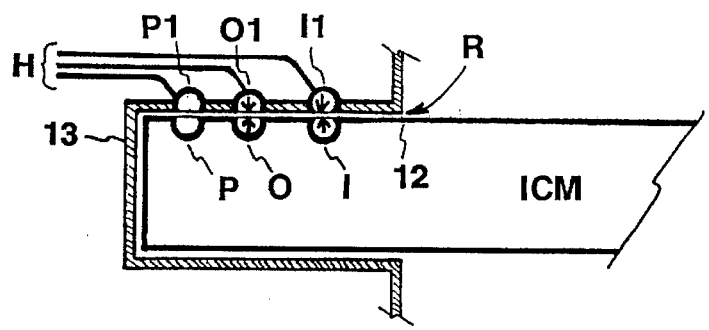
FIG. 2. A closeup sectional view of an ICM being held in a proper working position in an Interface Unit.

FIG. 2 depicts a closeup sectional view of an ICM, with its sealed housing 12, being held in place in the ICM holding receptacle R of the Interface Unit's sealed housing 13, so as to maintain the proper working relationship between the various parts of the connectorless interface. The ICM is held such that each emitter is positioned adjacent to its counterpart sensor or receptor in order to provide data communications, and energy to power the ICM. Power electro-magnetic emitter P1 is held near electro-magnetic receptor P; directional electro-magnetic emitter I1 is held near and aiming directly into directional electro-magnetic sensor I; directional electro-magnetic sensor O1 is held near and aiming directly into directional electro-magnetic emitter O.

The directional components are held so that the each directional emitter aims its output emissions directly into its corresponding directional sensor, and each directional sensor is lined up to accept emissions directly from its corresponding emitter.. Because both emitters and sensors are directional and lined up directly adjacent to each other, the emitters and sensors eliminate leakage of direct and reflected electro-magnetic emissions out of the receptacle R. Conventional non-directional emitters and sensors leak radiation that is able to be monitored by a clandestine device outside of the Interface Unit.

The directional electro-magnetic emitters and sensors are able to be any of the common directional devices operating anywhere within the electro-magnetic spectrum, including optical and radio frequency.

Two way data communication requires at least one emitter/sensor pair for data input to the ICM, and at least one emitter/sensor pair to provide data output communications. However, more emitter/sensor sets are able to be added to accommodate all the data and handshaking signals of standard serial or parallel data ports if desired.

Direct wiring H connects the connectorless interface components in the Interface Unit with a host computer, and a power source.

The ICM has all of its components sealed inside the cartridge 12 with emitters, sensors and receptors sealed into the surface, or just under the surface of the ICM cartridge housing so the ICMs are able to operate normally while maintaining physical environment protection. The cartridge is manufactured using materials selected for protection of the internal components in the particular environment the ICM is intended to be used. For example, encapsulating the ICM in a waterproof material makes the ICM useable in moist environments. Likewise, the Interface Unit has its sensors and emitters sealed into the interior surface of its housing 13 in a similar way, and for the same reason.

FIG. 3 is a block diagram depicting the present invention connected to an input/output port (HOST PORT) of a HOST COMPUTER. The host computer's CPU (HOST CPU) is connected to several resources in the conventional manner, such as: a hard disk mass data storage device 1, a floppy disk 2, a keyboard 3, a video monitor 4, and a printer 5. The directional emitter I1 and directional sensor O1 of the communications portion of the connectorless interface in the INTERFACE UNIT are connected to the HOST COMPUTER via the data communications port, HOST PORT. Art electric power connection 6, made in the conventional manner, is connected to the power emitter of the connectorless interface P1.

The ICM is shown inserted into the INTERFACE UNIT (as in FIG. 2) so as to position matching emitters and sensors/receptors adjacent to each other to provided the needed energy transfer, and to prevent leakage of communications emissions. Energy from P1 goes to connectorless interface receptor P which is connected to AC rectifier and filter (PWR), which in turn distributes power 7 to all of the various components within the ICM.

Connectorless interface directional emitter I1, and directional sensor O1 are physically located in the INTERFACE UNIT, and provide a two-way data communications link to the ICM. Directional emitter I1 and directional sensor I form an emitter/sensor pair for providing a secure data communications link input to the ICM. Directional emitter O and directional sensor O1 form an emitter/sensor pair for providing a secure data communications link output from the ICM. Emitter O and sensor I are physically sealed into the ICM cartridge and are connected to the input/output port, I/O. The I/O port has data connections 8, and port control lines 9 connected to the ICM-based CPU, such that the CPU provides the sole means of control for the I/O port.

The CPU is connected to two independently addressable subdivisions of memory, the EXECUTIVE MEMORY, and the GENERAL MEMORY. The GENERAL MEMORY is connected via a conventional BUS and at least one portion of its addressable range is made of read/write RAM. The EXECUTIVE MEMORY has at least one portion of its addressable range made of non-volatile ROM.

The EXECUTIVE MEMORY is connected through a bus on/off SWITCH. The SWITCH's state of being on or off is controlled by a memory-division-selection LATCH. The state of this LATCH is set or reset by two output lines 10 and 11. Line 10 is connected to a command-controlled CPU output which sets the LATCH upon the execution of a specific program command by the CPU; which in turn, turns off the bus SWITCH preventing all data and program access to the EXECUTIVE MEMORY. Line 11 is connected to a command-controlled CPU output which resets the LATCH; which in turn, turns the bus SWITCH on, resuming access to the EXECUTIVE MEMORY. Line 11 is also connected to a CPU input line which causes an automatic non-maskable interrupt, NMI, and program control jump to a fixed address in the EXECUTIVE MEMORY.

The following programming example (using the standard programming art) illustrates the common operation of the various components of the new architecture. The conventional power-up reset signal to the CPU starts the security-controlling applications program SP in a section of ROM memory within the EXECUTIVE MEMORY. When the need arises, the ICM-based program SP issues a function request for access to a host resource such as reading data from a mass data storage device. The function request is made to the HOST COMPUTER by writing a function request command to the I/O port. The function request command is transferred through the connectorless interface emitter O to INTERFACE UNIT sensor O1, (in a serial fashion if only one emitter/sensor pair is used, and in a parallel fashion if multiple emitter/sensor pairs are in use as O and O1); to the HOST PORT. The host operating system program HP in the HOST MEMORY causes the HOST CPU to read the function request command from the HOST PORT, and then process that function request by accessing the requested data from mass data storage device 1, and then writing the data to the HOST PORT. The data in turn, goes through the connectorless interface of the INTERFACE UNIT, via emitter I1 to ICM sensor I, to the I/O port in the ICM. The secure ICM-based applications program SP then reads the data from the I/O port, and writes the data into the ICM RAM.

When a need arises to run a non-ICM-based program within the ICM, then, a function request is issued by the ICM-based program SP just as above, with the new program NP received back being stored in the GENERAL MEMORY RAM. The secure program SP is then able to examine, decrypt, or preform any other needed operation on the up-loaded information NP. When the security program SP has determined that the up-loaded new program NP is able to be operated, a small section of code containing a switching command to turn off the EXECUTIVE MEMORY is executed, immediately followed by a command control jump to the new program NP in the GENERAL MEMORY. This switching command activates the command-controlled CPU output line 10 which sets the memory selection LATCH. This LATCH controls the memory on/off SWITCH, which turns off all read/write access to the EXECUTIVE MEMORY. Program control is then turned over to the up-loaded program NP in the GENERAL MEMORY for running;, which likewise is able use function request commands to the HOST COMPUTER as described above.

With the SWITCH held in the off position by the LATCH, the CPU is unable to read from or write to the EXECUTIVE MEMORY. During the off state, no program in the GENERAL MEMORY, rogue or otherwise, is able to access any of the secret information in the EXECUTIVE MEMORY. Such information is unable to be copied or altered, so that security is maintained during the entire time that non-ICM-based (including non-secure or even rogue programs) are running.

Upon completion of the up-loaded program, NP executes a command to resume access to the EXECUTIVE MEMORY, which activates the command-controlled CPU line 11; resetting the LATCH; turning on the on/off SWITCH; turning on access to the EXECUTIVE MEMORY. Also connected to line 11 is a non-maskable CPU input line NMI. The reactivation of the EXECUTIVE MEMORY, along with the simultaneous activation of this NMI input line causes a program control jump to a fixed address within the EXECUTIVE MEMORY. Because of this, secure program control is simultaneously resumed, preventing any non-secure program in the GENERAL MEMORY from exercising program control when the EXECUTIVE MEMORY is accessible.

The entire two-way communications link between the HOST COMPUTER and the ICM is completely controlled by the host program HP on one end, and either SP or NP operating inside the ICM on the other end. This architectural arrangement of the apparatus prevents any program operating in one computer from directly accessing any information in the other computer without such action being controlled by the program operating in the target computer. No information is able to be transferred from one computer to the other without an express provision for such transfer within the outputting computer. No programming code is able to be run within either of the computers without an express provision within the initial program inside the target computer. No information is able to be altered within either computer without an express program provision within the target computer to accomplish the alteration. As a result, each of the programs, HP, SP, and NP are able to maintain complete secrecy of any information contained within themselves individually.

No secret information is able to be copied out of the ICM, and no information is able to be altered within the ICM at the direct command of any program operating within the HOST COMPUTER. The HOST COMPUTER, all of the information stored in the HOST MEMORY, and the host resources 1 through 5, are completely under the control of program HP, and are unable to be directly copied or altered by any program operating in the ICM. As a result, the ICM is protected from copying and/or alteration by any rogue program in the HOST COMPUTER, and the HOST COMPUTER is protected from any rogue program operating in the ICM.

All of the security-sensitive components including the CPU, I/O, I, O, P, PWR, BUS, LATCH, SWITCH, EXECUTIVE MEMORY, and GENERAL MEMORY are contained within the single sealed cartridge housing 12 to prevent access to these components either during operation, or during periods of non-use. As a result, the secure program SP is able to be maintained as the only-existing-copy of said secure program so that removal of the cartridge 12 from the INTERFACE UNIT simultaneously removes all of the security sensitive components as well as the secure applications program SP. So that together, they all are able to be locked in a safe, or otherwise made physically secure, when not in use.

What is claimed is:

1. A secure computer architectural and apparatus system comprising an Independent Computer Module (here after referred to as an ICM), and an Interface Unit for providing two-way data communications between said ICM and a host computer;

said ICM comprising a single cartridge housing and a computer therein comprised of security-sensitive components including: a central data processing means, a memory means, an energy supply means, component interconnecting means, and a two-way data communications means for providing two-way data communications between said ICM and said Interface Unit;

said ICM further comprising at least one applications program within said memory means;

said memory means further comprising read/write random access type memory (RAM) as one portion of the addressable range of said memory means;

said RAM is to enable the operation of general purpose applications programs;

said two-way data communications means within said ICM further comprising a two-way data communications control means exclusively controlled by means of command-signals from said central data processing means;

said two-way data communications control means is to prevent said host computer from directly transferring data:
(a) into said memory means,
(b) into said central data processing means,
(c) out of said memory means,
(d) out of said central data processing means;

said Interface Unit is comprised of a means for two-way data communications with said ICM, a means for two-way data communications with said host computer, and a receptacle for receiving said ICM;

said secure computer architectural and apparatus system is for operating said at least one applications program contained within said ICM, while being able to prevent said at least one applications program from being down-loaded into said host computer, while being able to prevent said at least one applications program from being copied by said host computer, and while being able to prevent said at least one applications program from being altered by said host computer;

said single cartridge housing is to contain and prevent access to said security-sensitive components, to contain and prevent access to said at least one applications program, to prevent data communications into or out of said ICM by any means other than said two-way data communications means, while enabling booth said security-sensitive components and said at least one applications program to be simultaneously removed from said Interface Unit and made physically secure in a safe place.

2. A first portable secure computer architecture for protecting information and at least one program for controlling said information, comprising:

a single sealed cartridge and a computer contained within said cartridge, said computer having a central data processing means, communications means controlled by said central data processing means for providing information into and/or output from said cartridge and said computer, memory means controlled by said central data processing means, information within said memory means, at least one program within said memory means which controls said central data processing means and ultimately said information and said at least one program, said computer further having a cryptographic program including at least one encryption/decryption key for encrypting outgoing information and decrypting incoming information, said cryptographic program having an only existing copy of said at least one encryption/decryption key which exists only in said portable secure computer architecture and which is unknown to any human.

3. The invention of claim 2 wherein said at least one encryption/decryption key is machine-generated.

4. The invention of claim 2 including at least one additional portable secure computer architecture which contains the same said only existing copy of said at least one encryption/decryption key thereby facilitating secure communications between said portable secure computer architectures.

5. The invention of claim 3 including at least one additional portable secure computer architecture which contains the same said only existing copy of said at least one encryption/decryption key thereby facilitating secure communications between said portable secure computer architectures.

6. A first portable secure computer architecture for protecting information and at least one program for controlling said information, comprising:

a single sealed cartridge and a computer contained within said cartridge, said computer having a central data processing means, communications means controlled by said central data processing means for providing information into and/or output from said cartridge and said computer, memory means controlled by said central data processing means, information within said memory means, at least one program within said memory means which controls said central data processing means and ultimately said information and said at least one program, said computer further having a cryptographic program including at least one encryption key for encrypting outgoing information, said cryptographic program having an only existing copy of said at least one encryption key which exists only in said portable secure computer architecture and which is unknown to any human.

7. The invention of claim 6 wherein said at least one encryption key is machine-generated.

8. The invention of claim 6 including at least one additional portable secure computer architecture which contains the same said only existing copy of said at least one encryption key thereby facilitating secure communications between said portable secure computer architectures.

9. The invention of claim 7 including at least one additional portable secure computer architecture which contains the same said only existing copy of said at least one encryption key thereby facilitating secure communications between said portable secure computer architectures.

10. A first portable secure computer architecture for protecting information and at least one program for controlling said information, comprising:

a single sealed cartridge and a computer contained within said cartridge, said computer having a central data processing means, communications means controlled by said central data processing means for providing information into and/or output from said cartridge and said computer, memory means controlled by said central data processing means, information within said memory means, at least one program within said memory means which controls said central data processing means and ultimately said information and said at least one program, said computer further having a cryptographic program including at least one decryption key for decrypting incoming information, said cryptographic program having an only existing copy of said at least one decryption key which exists only in said portable secure computer architecture and which is unknown to any human.

11. The invention of claim 10 wherein said at least one decryption key is machine-generated.

12. The invention of claim 10 including at least one additional portable secure computer architecture which contains the same said only existing copy of said at least one decryption key thereby facilitating secure communications between said portable secure computer architectures.

13. The invention of claim 11 including at least one additional portable secure computer architecture which contains the same said only existing copy of said at least one decryption key thereby facilitating secure communications between said portable secure computer architectures.

14. A method of providing user-specific operation of processing functions within a portable secure computer architecture comprising the following steps:

providing a portable secure computer having at least one program for controlling information within said portable secure computer capable of maintaining said control from within said portable secure computer to prevent tampering with said at least one program and said information;

providing a user-identification process within said at least one program for controlling program flow within said at least one program, thereby providing user-specific control of said information and said at least one program within said portable secure computer.

15. The method of claim 14 including:

providing a cryptographic routine within said at least one program under said user-specific control which includes at least one decryption key for decrypting encrypted information input to said portable secure computer, said at least one decryption key being unavailable to a specific user of said portable secure computer architecture, thereby providing a separation between the functions of user-identification and information protection through encryption, because said specific user is able to operate said at least one program that is able to use said encrypted information without revealing to said specific user said at least one decryption key used to protect said encrypted information, while maintaining control of all said information by said at least one program which is being continually protected within said portable secure computer architecture.

* * * * *